(12) United States Patent
Kopecek (10) Patent No.: US 11,415,197 B2
(45) Date of Patent: Aug. 16, 2022

(54) STAR WORM GEAR

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 27 days.

(21) Appl. No.: 16/665,754

(22) Filed: Oct. 28, 2019

(65) Prior Publication Data

US 2021/0123504 A1 Apr. 29, 2021

(51) Int. Cl.
*F16H 1/30* (2006.01)
*F16H 25/20* (2006.01)

(52) U.S. Cl.
CPC ......... *F16H 1/30* (2013.01); *F16H 2025/209* (2013.01); *F16H 2025/2087* (2013.01)

(58) Field of Classification Search
CPC ..................................... F16H 1/30; F16H 3/68
USPC ........................................................ 475/333
See application file for complete search history.

(56) References Cited

U.S. PATENT DOCUMENTS

| | | | | |
|---|---|---|---|---|
| 2,940,337 A * | 6/1960 | Kalb | ....................... | F16H 37/00 475/6 |
| 4,346,728 A * | 8/1982 | Sulzer | ..................... | F16K 29/00 137/243.6 |
| 4,391,409 A * | 7/1983 | Scholz | ..................... | F02K 1/72 239/265.29 |
| 6,712,727 B2 * | 3/2004 | Kujira | .................... | F16H 37/041 475/149 |
| 7,108,625 B2 * | 9/2006 | Konig | ................. | F16H 37/0826 475/5 |
| 8,382,621 B2 * | 2/2013 | Chen | ....................... | F16K 31/05 475/4 |
| 10,024,405 B2 * | 7/2018 | Emmons | ................ | F16H 25/205 |
| 2012/0240696 A1 * | 9/2012 | Bastholm | ............. | A47C 20/042 74/89.38 |
| 2013/0184112 A1 * | 7/2013 | Choi | .................... | F16H 37/0826 475/5 |
| 2014/0034432 A1 * | 2/2014 | Bull | ...................... | B60T 13/741 188/106 R |
| 2015/0148185 A1 | 5/2015 | Kuo-Feng | | |

(Continued)

FOREIGN PATENT DOCUMENTS

WO WO2019140029 7/2019

OTHER PUBLICATIONS

PCT International Search Report and Written Opinion in International Appln. No. PCT/US2020/056809, dated Feb. 9, 2021, 23 pages.

*Primary Examiner* — Timothy Hannon
(74) *Attorney, Agent, or Firm* — Fish & Richardson P.C.

(57) ABSTRACT

The subject matter of this specification can be embodied in, among other things, an actuator that includes a worm drive assembly having a worm shaft, and a worm wheel configured as a ring having a radially outer perimeter comprising a first collection of gear teeth extending radially outward from the radially outer perimeter and at least partly engaged with the worm shaft, and a coaxial radially inner perimeter comprising a second collection of gear teeth extending radially inward from the inner perimeter, and an epicyclic gear assembly having a sun gear and a planet gear engaged with the sun gear and the second collection of gear teeth.

18 Claims, 4 Drawing Sheets

(56) References Cited

U.S. PATENT DOCUMENTS

2016/0339890 A1* 11/2016 Cann .................... B60T 13/745
2019/0316640 A1* 10/2019 Jeon ................... F16H 63/3466

* cited by examiner

STAR WORM GEAR

TECHNICAL FIELD

This instant specification relates to rotary-to-linear motion conversion devices for use with aircraft cascade reverser actuators.

BACKGROUND

Conventional thrust reverser actuators for cascade type thrust reversers use back-driving worm gears attached to flexible cables or shafts to synchronize the actuators together. Back driven worm gears have been used with aircraft cascade reverser actuators since the 1980's. This technology has been used with great success with a large number of commercial hydraulic cascade thrust reverser actuation systems. However, thrust reverser technology is changing and as such requires newer associated technologies. New advanced technology thrust reversers impose much higher rotational speeds on the synchronization shafts which can exceed the shaft manufacturer's maximum design speed.

SUMMARY

In general, this document describes rotary-to-linear motion conversion devices. More particularly, this document describes rotary-to-linear motion conversion devices for use with aircraft cascade reverser actuators.

In a general aspect, an actuator includes a worm drive assembly having a worm shaft, and a worm wheel configured as a ring having a radially outer perimeter comprising a first collection of gear teeth extending radially outward from the radially outer perimeter and at least partly engaged with the worm shaft, and a coaxial radially inner perimeter comprising a second collection of gear teeth extending radially inward from the inner perimeter, and an epicyclic gear assembly having a sun gear and a planet gear engaged with the sun gear and the second collection of gear teeth.

Various implementations can include some, all, or none of the following features. The actuator can also include a first worm shaft engaged with the worm shaft. The actuator can also include a second worm drive assembly comprising a second worm shaft rotatably coupled to the first worm shaft. The first worm shaft can be rotatably coupled to the second worm shaft by a synchronization shaft configured to substantially synchronize actuation of two or more aircraft engine thrust reverser actuation systems. The actuator can also include a linear actuator assembly having a leadscrew engaged to the sun gear and responsive to revolution of the sun gear, and a nut engaged with the leadscrew and axially movable along the leadscrew in response to rotation of the leadscrew. The nut can include a ball nut, and the leadscrew can include a ball screw. The actuator can also include a linear output member engaged with the nut and axially moveable between a retracted position and an extended position in response to axial movement of the nut. The linear output member can be configured as an actuator of an aircraft engine thrust reverser actuation system. The actuator can also include a linear actuator assembly having a planet carrier engaged with the planet gear, and responsive to orbit of the planet gear about the sun gear, a leadscrew engaged to the planet carrier, and a nut engaged with the leadscrew and axially movable along the leadscrew in response to rotation of the leadscrew. The actuator can also include a linear output member engaged with the nut and axially moveable between a retracted position and an extended position in response to axial movement of the nut. The nut can include a ball nut, and the leadscrew comprises a ball screw. The actuator can also include a linear actuator assembly having a nut engaged to the sun gear and responsive to revolution of the sun gear, and a leadscrew, engaged with the nut and axially moveable though the nut in response to rotation of the nut. The sun gear can also include the nut, where the sun gear has a threaded axial aperture configured to matingly engage the leadscrew. The actuator can also include a linear actuator assembly having a nut engaged to the planet gear and responsive to revolution of the planet gear, and a leadscrew, engaged with the nut and axially moveable though the nut in response to rotation of the nut. The sun gear can also include an axial aperture and the leadscrew is configured to at least partly extend though the aperture in response to axial movement of the leadscrew. The worm shaft can be configured to be driven by a rotational input, and one of the sun gear or the worm wheel can be configured to drive a rotational output. One of the sun gear or the worm wheel can be configured to driven by a rotational input, and the worm shaft can be configured to drive a rotational output. One of the sun gear or the worm wheel can be rotationally affixed to a housing.

In another general aspect, a method of rotary-to-linear actuation includes rotating a worm shaft, urging, by the worm shaft, rotation of a worm wheel configured as a ring having a radially outer perimeter comprising a first collection of gear teeth extending radially outward from the radially outer perimeter and at least partly engaged with the worm shaft, and a radially inner perimeter comprising a second collection of gear teeth extending radially inward from the inner perimeter, urging, by the worm wheel, rotation of a planet gear engaged with the second collection of gear teeth about a sun gear engaged with the planet gear, wherein the worm wheel, the planet gear, and the sun gear are configured as an epicyclic gear assembly, and urging, by the epicyclic gear assembly, rotation of a rotary output member.

Various implementations can include some, all, or none of the following features. Urging, by the epicyclic gear assembly, rotation of an output shaft can also include urging, by the worm wheel, orbit of the planet gear about the sun gear, urging, by the planet gear, rotation of a planet carrier engaged with the planet gear, and urging, by rotation of the planet carrier, rotation of the rotary output member. Urging, by the epicyclic gear assembly, rotation of an output shaft can also include urging, by the planet gear, rotation of the sun gear, and urging, by the sun gear, rotation of the rotary output member. The method can also include urging rotation of a second worm shaft by a worm shaft, where the worm shaft is configured to urge rotation of the worm shaft. The method can also include urging substantially synchronous deployment or stowage of two or more aircraft engine thrust reverser actuation systems, where a first worm shaft of a first aircraft engine thrust reverser actuation system is rotatably coupled to a second worm shaft of a second aircraft engine thrust reverser actuation system by a synchronization shaft configured to substantially synchronize actuation of the two or more aircraft engine thrust reverser actuation systems. The method can also include urging, by the rotary output member, rotation of a leadscrew, urging, by the leadscrew, axial movement of a nut engaged with the leadscrew, and urging, by the nut, axial motion of a linear output member between a retracted position and an extended position. The method can also include urging, by the rotary output member, rotation of a nut, urging, by the nut, axial movement of a leadscrew engaged with the nut, and urging, by the leadscrew, axial motion of a linear output member between a retracted position and an extended position. The method can also include urging, by axial movement of the linear output member, movement of an aircraft engine thrust reverser system between a stowed configuration and a deployed configuration.

The systems and techniques described here may provide one or more of the following advantages. First, a system can provide rotary-to-linear motion conversion in a compact, space and weight saving form. Second, the system can be configured to provide various predetermined gear ratios. Third, the system can gear reduction that can enable thrust reverser actuation systems to work with high-speed synchronization shafts. Fourth, the system can provide the gear reduction within the space envelope of existing synchronization systems.

The details of one or more implementations are set forth in the accompanying drawings and the description below. Other features and advantages will be apparent from the description and drawings, and from the claims.

DETAILED DESCRIPTION

While traditional back driven worm gears have been used with great success with traditional thrust reverser actuation systems (TRAS), thrust reverser technology is changing. Technologies such as hidden blocker door, sliding cascade, and other advanced technology reversers are, or soon will be, available for use. Advanced technology reversers are expected to operate with higher velocities than their predecessors, and newer technologies are needed in order to reduce flex shaft speeds to reasonable values. The star worm gear discussed in the present disclosure provides such capabilities in compact and lightweight forms, with minimal impact upon existing actuator designs.

In general, the gear assemblies discussed below are a hybrid of a worm gear and a planetary (epicyclic) gearbox, in which the ring gear of the planetary gearbox also acts as the worm wheel of the worm gear. The planetary gearbox is mechanically linked to a rotary-to-linear motion conversion assembly that, in turn, can drive the linear actuation and retraction of a TRAS. Various embodiments capture the sun gear of the planetary gearbox, and provide a rotary output from the planet carrier of the gearbox, while other embodiments capture the planet carrier and provide rotary output from the sun gear. In various implementations, rotary input can be provided through a worm shaft with rotary output provided from the planetary gearbox, or rotary input can be provided to the planetary gearbox with rotary output provided from the worm shaft.

Figure 1A:
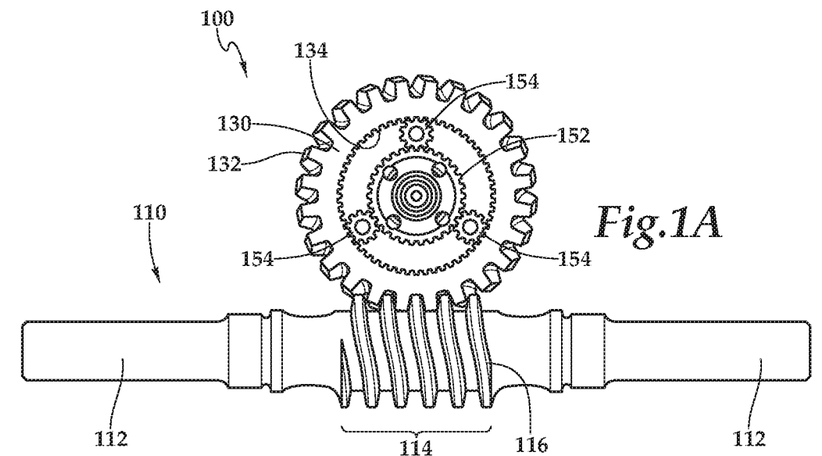
FIG. 1A is a side view of an example gear assembly, in accordance with an embodiment of the present disclosure.
Figure 1B:
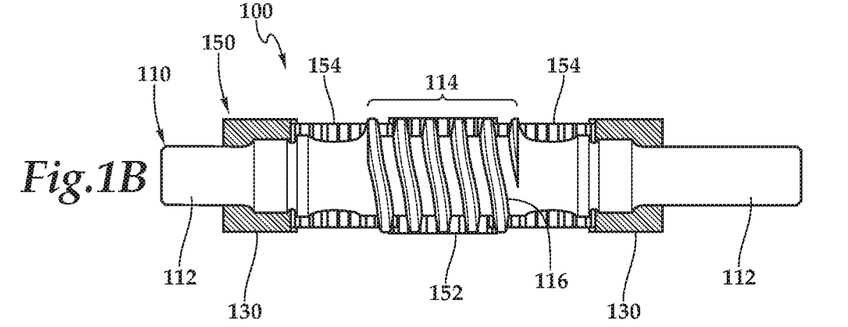
FIG. 1B is a top view of the example gear assembly, in accordance with an embodiment of the present disclosure.

FIG. 1A is a side view of an example gear assembly 100, in accordance with an embodiment of the present disclosure. FIG. 1B is a top view of the example gear assembly 100. The example gear assembly 100 includes two main components, a worm drive assembly 110 and a planetary (epicyclic) gearbox 150.

The worm drive assembly 110 includes a rotary shaft 112 that is rotatably coupled to a worm shaft 114 that includes a helical thread 116. A hybrid gear 130 includes a collection of gear teeth 132 projecting radially outward from an outer periphery of the hybrid gear 130 and configured to engage with the worm shaft 114. As the worm shaft 114 is rotated, the thread 116 engages the gear teeth 132 and urges rotation of the hybrid gear 130 about an axis that is substantially perpendicular to that of the worm shaft 114. In general terms, this arrangement of components functions as a worm gear. In some embodiments, the worm shaft 114 can have one or multiple helical threads (e.g., starts).

The planetary gearbox 150 includes a sun gear 152 that is configured to rotate about an axis, and a collection of planet gears 154 configured to engage the sun gear 152 and orbit the axis when actuated. Planetary gearboxes generally include a ring gear, also referred to as a star gear, in mechanical engagement with planet gears. In the illustrated example, the hybrid gear 130 is configured as a ring having a collection of gear teeth 134 projecting radially inward from an inner periphery of the ring. The gear teeth 134 are configured to mesh with the planet gears 154. In general terms, the hybrid gear 130 is configured to function as the ring gear of the planetary gearbox 150, while also being configured to function as the worm wheel of the worm drive assembly 110. The hybrid gear 130 provides a highly compact design, essentially being two gears in one, and providing rotational output that is orthogonal to the direction of rotational input.

In some embodiments, the planetary gearbox 150 can also include a planet carrier that is configured to be rotated by the orbital movement of the planet gears 154. Embodiments that include planet carriers are discussed in the descriptions of FIGS. 4 and 5. In some embodiments, the hybrid gear 130 can be a planetary gear when the ring is grounded. In some embodiments, the hybrid gear 130 can be a star gear when the planet carrier is grounded. For example, the planetary gear box 150 can be driven by the sun gear 152 (e.g., same as a planetary gear), and output can come from the hybrid gear 130. In such embodiments, the star gear ratio can be the planetary gear ratio minus one, and the direction of rotation will be opposite from a planetary gear.

As described above, the hybrid gear 130 has gear teeth on both the inside and the outside diameter. The gear teeth 134 (e.g., the inner teeth) are configured as spur gears to engage the corresponding teeth of the planet gears 154. The gear teeth 132 (e.g., the outer gear teeth) are configured to engage the thread 116 of the worm shaft 114. In some embodiments, a multiple start worm shaft can be used to allow backdrivability of the system. In some implementations, the assembly 100 can be a two-stage cross-axis gear that can be configured with great variety of gear ratios.

The gear ratio of the assembly 100 is determined by the number of teeth of the sun gear 152, the number of the gear teeth 134 on the inner diameter of the hybrid gear 130, the number of the gear teeth 132 on the outer diameter of the hybrid gear 130, and the number of starts (e.g., helical threads) on the worm shaft 114. The equation for the assembly 100 when driving from the sun gear 152 to the rotary shaft 112 is:

$$R_{star} = \frac{-N_{sun} * N_{RingOD}}{N_{RingID} * N_{Worm}}$$

The output direction is reversed from input direction because of the negative sign in the equation. However, if a left-hand thread (opposite direction thread) is chosen for the worm drive assembly 110, the negative sign is removed:

$$R_{star} = \frac{N_{sun} * N_{RingOD}}{N_{RingID} * N_{Worm}}$$

The gear ratio of the assembly 100 is determined by the number of teeth of the sun gear 152, the number of teeth on the inner diameter of the hybrid gear 130, the number of teeth on the outer diameter of the hybrid gear 130, and the number of starts on the worm drive assembly 110. The equation for the assembly 100 when driving from a planet carrier to the worm shaft 112 is:

$$R_{solar} = \frac{N_{RingOD}}{(1 + N_{sun}/N_{RingID}) * N_{Worm}}$$

Figure 2:
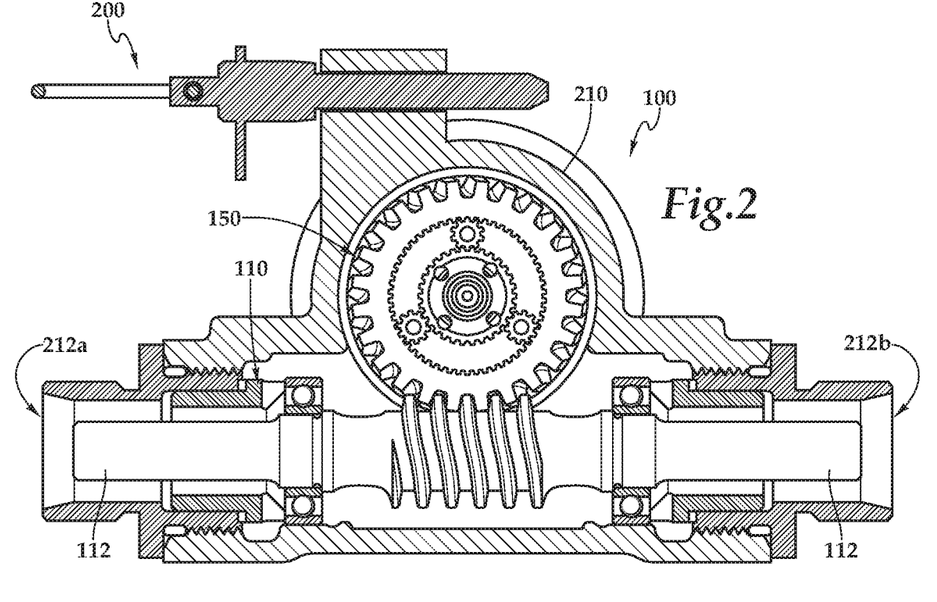
FIG. 2 is a partial cutaway side view of an example thrust reverser actuator including the example gear assembly of FIGS. 1A and 1B.

In general, the example gear assembly 100 is configured to transform rotary motion to/from linear motion in a TRAS. FIG. 2 is a partial cutaway side view of an example thrust reverser actuator 200 including the example gear assembly 100 of FIGS. 1A and 1B. In general, and as will be discussed further in the descriptions of FIGS. 3A-5, rotation of the rotary shaft is transformed to and from linear motion of a leadscrew that drives a linear actuator and an effector (e.g., a thrust reverser nacelle section). Again, as will be discussed further in the descriptions of FIGS. 3A-5, the leadscrew is rotationally coupled to a rotational input/output of the planetary gearbox 150.

The example gear assembly 100 is protected within a housing 210 of the actuator 200. The housing 210 includes a connection aperture 212a and a connection aperture 212b. The connection apertures 212a and 212b provide external access to the rotary shaft 112. The rotary shaft 112 is configured to be rotationally coupled to a synchronization shaft (not shown) through the connection apertures. In use, the synchronization shaft is used to transfer rotational energy to, from, and/or between TRAS units.

Figures 3A, 3B:
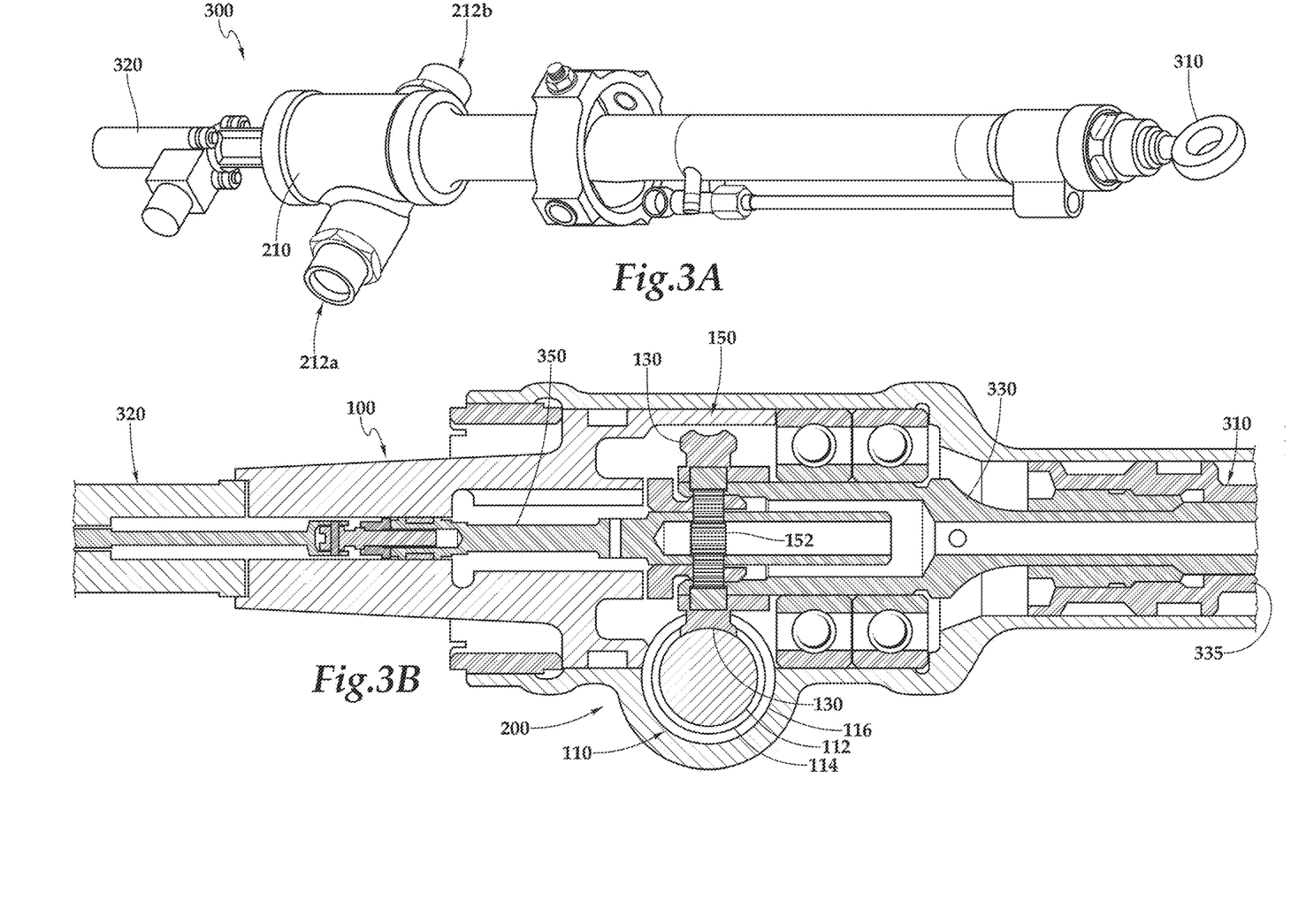
FIG. 3A is a perspective view of an example thrust reverser actuator system.
FIG. 3B is a cross sectional side view of the example thrust reverser actuator system of FIG. 3A.

FIG. 3A is a perspective view of an example thrust reverser actuator system (TRAS) 300. The example thrust reverser actuator system 200 includes the example actuator 200. Within the housing 210, the actuator 200 drives the extension and retraction of a linear actuator 310 based on rotational energy received from a synchronization shaft (not shown) connected to the actuator through the aperture 212a and/or 212b. The TRAS 300 also includes a sensor 320 configured to provide positional signals or information that is representative of the linear position (e.g., extension or retraction) of the linear actuator.

FIG. 3B is a cross sectional side view of the example thrust reverser actuator system 300 of FIG. 3A. Rotation of the rotary shaft 112 and the worm shaft 114 causes the helical thread 116 to engage the hybrid gear 130 and urge rotation of the hybrid gear 130. Rotation of the hybrid gear 130 actuates the planetary gearbox 150 to rotate about an axis that is substantially perpendicular to the axis of rotation of the rotary shaft 112 and the worm shaft 114.

In the illustrated example, actuation of the planetary gearbox 150 urges rotation of a rotary shaft 330. The rotary shaft 330 is threaded, and threadedly engages a captured nut 335, causing the nut 335 to travel linearly along the rotary shaft 330 as the rotary shaft 330 rotates relative to the captured nut 335. Linear movement of the nut 335 urges extension and retraction of the linear actuator 310.

In some embodiments, the captured nut 335 and the sun gear 152 can be combined. For example, the sun gear 152 can include a threaded hole through its axis, and a threaded shaft can be mated with the threaded hole. With the threaded shaft fixed from rotation, as the threaded sun gear rotates, the threaded shaft will be urged linearly though the hole, and the linear movement of the threaded shaft can be used to urge extension and retraction of the linear actuator 310.

In some embodiments, the sun gear 152 can include a hole that is large enough to not engage a threaded shaft, and a planet carrier can include a nut that is configured to threadedly mate with the threaded shaft. With the threaded shaft fixed from rotation, as the nut on the planet gear rotates, the threaded shaft will be urged linearly though the nut and the hole, and the linear movement of the threaded shaft can be used to urge extension and retraction of the linear actuator 310.

In the illustrated example, actuation of the planetary gearbox 150 also urges rotation of a rotary shaft 350. The sensor 320 is configured to directly or indirectly detect rotation of the rotary shaft 350. For example, the sensor 320 can include a potentiometer, rheostat, rotary variable differential transformer, encoder, or any other appropriate sensor that can detect rotation of the rotary shaft 350. In other examples, the rotary shaft 350 can be configured to drive a rotary-to-linear mechanism (e.g., leadscrew, ball screw), and the sensor 320 can include a linear encoder, linear variable differential transformer, or any other appropriate sensor that can detect linear extension and retraction of the rotary-to-linear mechanism. In some implementations, the sensed position of the linear actuator 310 can provide feedback for use by a control loop and/or operator.

Figure 4:
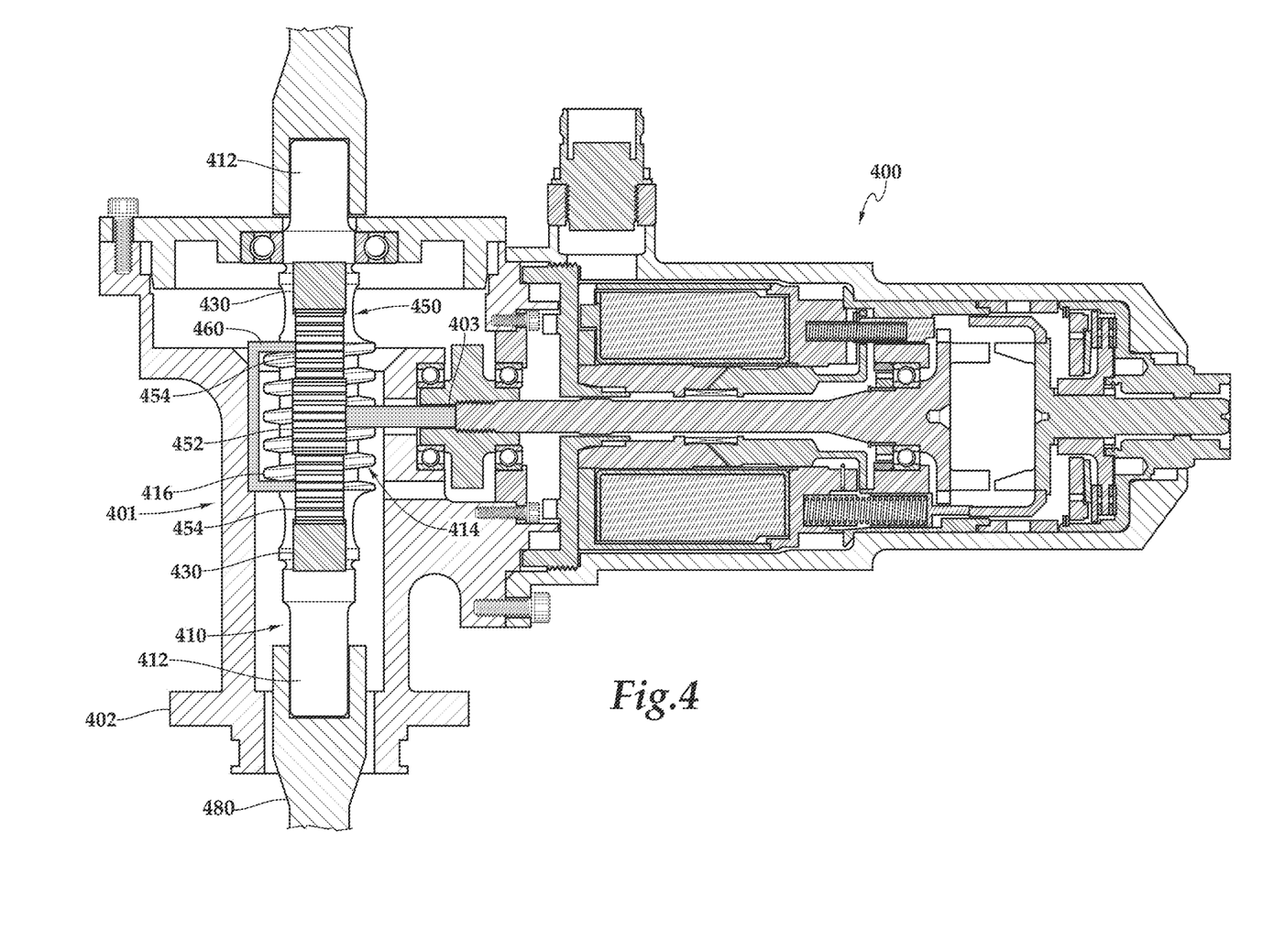
FIG. 4 is a partial cross sectional top view of another example of a thrust reverser actuator system, in accordance with an embodiment of the present disclosure.

FIG. 4 is a partial cross sectional top view of another example of a thrust reverser actuator system (TRAS) 400, in accordance with an embodiment of the present disclosure. The example TRAS 400 includes a gear assembly 401. In general, the example TRAS 400 is substantially similar to the TRAS 300 of FIGS. 3A and 3B, with the gear assembly 401 having a particular configuration that will be discussed below. The assembly 401 includes two main components, a worm drive assembly 410 and a planetary (epicyclic) gearbox 450 that are housed in a housing 402.

The worm drive assembly 410 includes a rotary shaft 412 that is rotatably coupled to a worm shaft 414 that includes a helical thread 416. The rotary shaft 412 is rotatably coupled to a synchronization shaft 480. A hybrid gear 430 is configured to engage with the worm shaft 414. As the worm shaft 414 is rotated, the thread 416 engages with and urges rotation of the hybrid gear 430 about an axis that is substantially perpendicular to that of the worm shaft 414. In general terms, this arrangement of components functions as a worm gear.

The planetary gearbox 450 includes a sun gear 452 that is configured to rotate about an axis, and a collection of planet gears 454 configured to engage the sun gear and orbit the axis when actuated. Planetary gearboxes generally include a ring gear, also referred to as a star gear, in mechanical engagement with planet gears. In the illustrated example, the hybrid gear 430 is configured as a ring having a collection of gear teeth (not shown) projecting radially inward from an inner periphery of the ring. The gear teeth are configured to mesh with the planet gears 454. In general terms, the hybrid gear 430 is configured to function as the ring gear of the planetary gearbox 450, while also being configured to function as the worm wheel of the worm drive assembly 410. The hybrid gear 430 provides a highly compact design, essentially being two gears in one, and providing rotational output that is orthogonal to the direction of rotational input.

The assembly 401 includes a planet carrier 460, and an output shaft 403 is rotationally coupled to the sun gear 452. The planet carrier 460 is affixed (e.g., grounded) to the housing 402, such that planet carrier 460 is prevented from rotating, and the planet gears 454 are able to rotate about their axes, but do not orbit the sun gear 452. In the illustrated example, rotation of the input shaft 412 causes rotation of the sun gear 452, which rotates the output shaft 403. The output shaft 403 is configured to actuate a rotary-to-linear motion conversion assembly, which in turn urges extension and retraction of a linear actuator, as described in previous paragraphs.

In some implementations, the assembly 401 can be useful when back-driving the input shaft 412 based on the linear movement of TRAS actuators. For example, the mechanical inefficiency of the assembly 401 can reduce lock load by up to and about 65%, when compared to existing TRAS configurations.

Figures 5, 6:
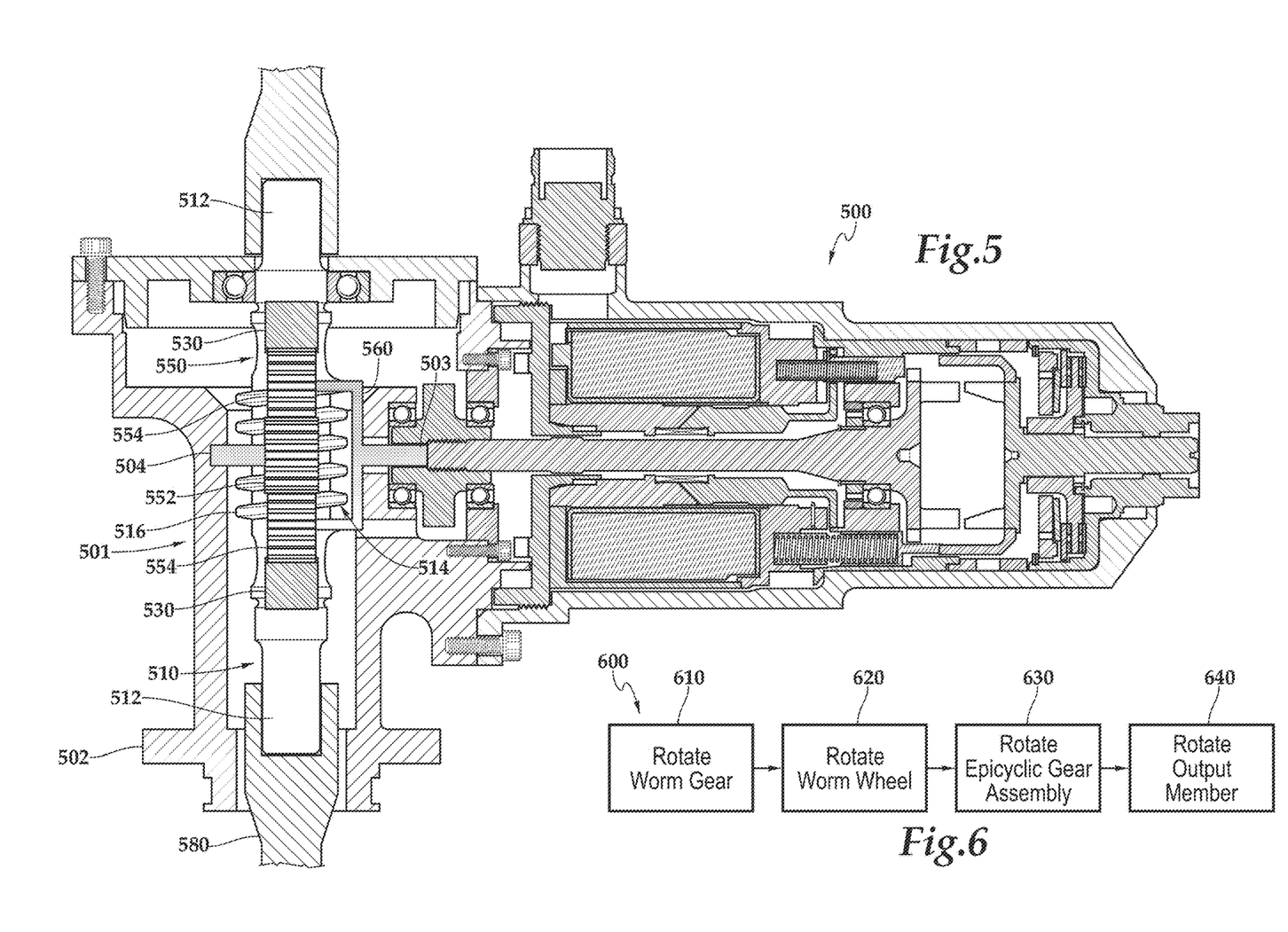
FIG. 5 is a partial cross sectional top view of another example of a thrust reverser actuator system, in accordance with an embodiment of the present disclosure.
FIG. 6 is a flow diagram of an example process for using a gear assembly, in accordance with an embodiment of the present disclosure.

FIG. 5 is a partial cross sectional top view of another example thrust reverser actuator system (TRAS) 500, in accordance with an embodiment of the present disclosure. The example TRAS 500 includes a gear assembly 501. In general, the example TRAS 500 is substantially similar to the TRAS 300 of FIGS. 3A and 3B, with the gear assembly 501 having a particular configuration that will be discussed below. The assembly 501 includes two main components, a worm drive assembly 510 and a planetary (epicyclic) gearbox 550 that are housed in a housing 502.

The worm drive assembly 510 includes a rotary shaft 512 that is rotatably coupled to a worm shaft 514 that includes a helical thread 516. The rotary shaft 512 is rotatably coupled to a synchronization shaft 580. A hybrid gear 530 is configured to engage with the worm shaft 514. As the worm shaft 514 is rotated, the thread 516 engages with and urges rotation of the hybrid gear 530 about an axis that is substantially perpendicular to that of the worm shaft 514. In general terms, this arrangement of components functions as a worm gear.

The planetary gearbox 550 includes a sun gear 552 that is configured to rotate about an axis, and a collection of planet gears 554 configured to engage the sun gear and orbit the axis when actuated. Planetary gearboxes generally include a ring gear, also referred to as a star gear, in mechanical engagement with planet gears. In the illustrated example, the hybrid gear 530 is configured as a ring having a collection of gear teeth (not shown) projecting radially inward from an inner periphery of the ring. The gear teeth are configured to mesh with the planet gears 554. In general terms, the hybrid gear 530 is configured to function as the ring gear of the planetary gearbox 550, while also being configured to function as the worm wheel of the worm drive assembly 510. The hybrid gear 530 provides a highly compact design, essentially being two gears in one, and providing rotational output that is orthogonal to the direction of rotational input.

The sun gear 552 is affixed to a fixed shaft 504 that is fixed (e.g., grounded) to the housing 502, and as such the sun gear 552 is prevented from rotating. The assembly 501 includes a planet carrier 560 to which an output shaft 503 is rotationally coupled. The planet carrier 560 is configured to rotate as the planet gears 554 orbit the sun gear 552, which is prevented from rotating by the fixed shaft 504. In the illustrated example, rotation of the input shaft 512 causes rotation of the planet carrier 560, which rotates the output shaft 503. The output shaft 503 is configured to actuate a rotary-to-linear motion conversion assembly, which in turn urges extension and retraction of a linear actuator, as described in previous paragraphs.

In some implementations, the assembly 501 can be useful when back-driving the input shaft 512 based on the linear movement of TRAS actuators. For example, the mechanical inefficiency of the assembly 501 can reduce lock load by up to and about 65%, when compared to existing TRAS configurations.

An example application of the assembly 501 can be to reduce the shaft speed of synchronization cables between two or more actuators in a TRAS. In such examples, the TRAS actuators are liked with synchronizing cables (or shafts), such as the example synchronization shafts 480 or 580. In a synchronized actuator, linear translation of a piston with a lead screw not on its inner diameter rotates a lead screw. The sun gear 552 can be attached to the output shaft 503 and the planet carrier 560 is grounded. The planetary gear assembly 550 reduces the speed of the back-driving hybrid gear 530, which in turn drives the worm shaft 514. A similar arrangement is possible with the assembly 401, in which the output shaft 403 is attached to the planet carrier 460 and the sun gear 452 is grounded.

Another example application of the assembly 401 is in a TRAS synchronization lock. In a synchronization lock (sync lock), the sync lock provides an additional line of protection against inadvertent in-flight deployment of a TRAS. For example, the worm shaft 414 can be attached to a worm shaft of a sync lock. The worm shaft of the sync lock can engages the hybrid gear 430 of the assembly 401. The sun gear 452 can be attached to the rotating element of the lock assembly. The planet carrier 460 can be grounded. The gear ratio of the assembly 401 can be used to adjust the speed of the rotational lock to a desired value.

A similar arrangement is possible with the assembly 501. The planet carrier 560 can be attached to the sync lock rotational lock element. The sun gear 512 can be grounded. In some implementations, assembly 501 may be especially useful for some devices because it has overdrive capability. Therefore, when the assembly 501 is reverse-driven from the worm shaft 514 to the planet carrier 560, it can effectively provide a two-stage gear-down.

FIG. 6 is a flow diagram of an example process 600 for using a gear assembly, in accordance with an embodiment of the present disclosure. In some implementations, the process 600 can be used with the example assembly 100 of FIGS. 1A-3B, or the example TRAS 400 or 500 of FIGS. 4 and 5.

At 610, a worm gear is rotated. For example, the input shaft 112 can rotate the worm shaft 114 of the worm drive assembly 110.

At 620, rotation of a worm wheel can be urged by the worm gear. The worm wheel is be configured as a ring having a radially outer perimeter having a first collection of gear teeth extending radially outward from the outward perimeter and at least partly engaged with the worm gear, and a radially inner perimeter having a second collection of gear teeth extending radially inward from the inner perimeter. For example, rotation of the worm shaft 114 can urge rotation of the hybrid gear 130, which has the gear teeth 132 arranged about the outer periphery of the hybrid gear 130 to intermesh with the thread 116, and also has the gear teeth 134 arranged about an inner perimeter to intermesh with the planet gears 154.

At 630, rotation of a planet gear is urged by the worm wheel. The planet gear is engaged with the second collection of gear teeth about a sun gear engaged with the planet gear, where the worm wheel, the planet gear, and the sun gear are configured as an epicyclic gear assembly. For example, as the hybrid gear 130 rotates, the planet gears 154 will rotate as well. Depending on the particular configuration, rotation of the planet gears 154 can cause the planet gears 154 to intermesh with and orbit the sun gear 152 (e.g., as in the example TRAS 700), and/or rotation of the planet gears 154 can cause the planet gears 154 to urge rotation of the sun gear 152 (e.g., as in the example TRAS 400).

At 640, rotation of a rotary output member is urged by the epicyclic gear assembly. For example, planetary gearbox 150 of the assembly 100 can urge rotation of the rotary shaft 330.

In some implementations, urging, by the epicyclic gear assembly, rotation of an output shaft can also include urging, by the worm wheel, orbit of the planet gear about the sun gear, urging, by the planet gear, rotation of a planet carrier engaged with the planet gear, and urging, by rotation of the planet carrier, rotation of the rotary output member. For example, the rotary shaft 330 can be rotated by the planet carrier 460 coupled to the planet gears 452.

In some implementations, urging, by the epicyclic gear assembly, rotation of an output shaft can also include urging, by the planet gear, rotation of the sun gear, and urging, by the sun gear, rotation of the rotary output member. For example, the rotary shaft 330 can be rotated by the sun gear 454 coupled to the planet gears 452.

In some implementations, the process 600 can also include urging rotation of a second worm gear by a worm shaft, wherein the worm shaft is configured to urge rotation of the worm gear. In some implementations, the process 800 can also include urging substantially synchronous deployment or stowage of two or more aircraft engine thrust reverser actuation systems, wherein the first worm shaft is rotatably coupled to the second worm shaft by a synchronization shaft configured to substantially synchronize actuation of the two or more aircraft engine thrust reverser actuation systems. For example, aircraft thrust reversers typically include multiple TRAS units, and in such examples the rotary shaft 112 of one TRAS 300 can be connected to a complimentary rotary shaft 112 of another TRAS 300 by a synchronization shaft such as the example synchronization shaft 480 or 580. As the synchronization shaft rotates, both of the TRAS units can be actuated substantially in synchronicity. In some examples, the sync shaft can be rotated by an external force (e.g., a motor). In some examples, the sync shaft can be rotated by one TRAS to cause actuation of another TRAS (e.g., linear motion of one TRAS can backdrive the assembly 100 and cause substantially similar linear motion in another TRAS).

In some implementations, the process 600 can also include urging by the rotary output member rotation of a leadscrew, urging by the leadscrew axial movement of a nut engaged with the leadscrew, and urging by the nut axial motion of a linear output member between a retracted position and an extended position. For example, the planetary gearbox 150 can rotate the rotary shaft 330, and rotation of the rotary shaft 330 can cause the captured nut 335 to travel linearly along the rotary shaft.

In some implementations, the process 600 can also include urging by the rotary output member rotation of a nut, urging by the nut axial movement of a leadscrew engaged with the nut, and urging by the leadscrew axial motion of a linear output member between a retracted position and an extended position. For example, the planetary gearbox 150 can be coupled (e.g., by the sun gear 152 or by a planet carrier) to a nut, and a rotationally captured threaded shaft can be drawn through the nut as the nut rotates, and the rotationally captured threaded shaft can be coupled to the linear actuator 310 to urged extension and retraction of the linear actuator 310.

In some implementations, movement of an aircraft engine thrust reverser system between a stowed configuration and a deployed configuration can be urged by axial movement of the linear output member. For example, a cowl portion of an engine nacelle coupled to the linear actuator 310 can be deployed and retracted by actuation of the linear actuator 310 by the example assemblies 100, 401, or 501.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An actuator comprising:
    a housing;
    a worm drive assembly comprising:
        a worm shaft configured to rotate about a first axis; and
        a worm wheel configured as a ring configured to rotate about a second axis that is substantially perpendicular to the first axis and having a radially outer perimeter comprising a first collection of gear teeth extending radially outward from the radially outer perimeter and at least partly engaged with the worm shaft, and a coaxial radially inner perimeter comprising a second collection of gear teeth extending radially inward from the coaxial radially inner perimeter;
    an epicyclic gear assembly comprising:
        a sun gear;
        a grounded planet gear carrier groundedly affixed to the housing; and
        a planet gear carried by the grounded planet gear carrier and engaged with the sun gear and the second collection of gear teeth;
    a rotary-to-linear motion conversion assembly comprising a rotary assembly and a linear assembly;
    a rotary shaft engaged to the rotary assembly and the sun gear; and
    a linear member engaged to the linear assembly and configured to move linearly.

2. The actuator of claim 1, further comprising a first rotary shaft engaged with the worm shaft.

3. The actuator of claim 1, further comprising a second actuator comprising a second worm drive assembly comprising a second worm shaft rotatably coupled to the worm shaft.

4. The actuator of claim 3, wherein the worm shaft is rotatably coupled to the second worm shaft by a synchronization shaft configured to substantially synchronize actuation of two or more aircraft engine thrust reverser actuation systems.

5. The actuator of claim 1, wherein the worm shaft is configured to be driven by a rotational input, and the sun gear is configured to drive the rotary shaft.

6. The actuator of claim 1, wherein the sun gear is configured to be driven by the rotary shaft, and the worm shaft is configured to be driven by the epicyclic gear assembly to drive a rotational output coupled to the worm shaft.

7. The actuator of claim 1, further comprising
a nut affixed to the linear member and engaged with the rotary shaft, and axially movable along the rotary shaft in response to rotation of the rotary shaft.

8. The actuator of claim 7, wherein the nut comprises a captured nut, and the rotary shaft comprises a threaded rotary shaft.

9. The actuator of claim 8, wherein the linear member is axially moveable between a retracted position and an extended position in response to axial movement of the nut.

10. The actuator of claim 9, wherein the linear member is configured as an actuator of an aircraft engine thrust reverser actuation system.

11. The actuator of claim 1,
wherein the sun gear comprises a nut responsive to revolution of the sun gear; and
the rotary shaft is threadedly engaged with the nut and is configured to be axially moveable though the nut in response to rotation of the nut by the sun gear.

12. The actuator of claim 1, wherein the sun gear further comprises a threaded axial aperture and the rotary shaft is threadedly engaged to the threaded axial aperture such that the rotary shaft is axially moveable though the threaded axial aperture in response to rotation of the sun gear.

13. The actuator of claim 12, wherein the rotary shaft is configured to at least partly extend though the threaded axial aperture in response to axial movement of the rotary shaft.

14. A method of rotary-to-linear actuation comprising:
rotating a worm shaft about a first axis;
urging, by the worm shaft, rotation of a worm wheel about a second axis that is substantially perpendicular to the first axis, wherein the worm wheel is configured as a ring having a radially outer perimeter comprising a first collection of gear teeth extending radially outward from the radially outer perimeter and at least partly engaged with the worm shaft, and a radially inner perimeter comprising a second collection of gear teeth extending radially inward from the radially inner perimeter;
urging, by the worm wheel, rotation of a planet gear, carried by a grounded planet gear carrier groundedly affixed to a housing, and engaged with the second collection of gear teeth about a sun gear engaged with the grounded planet gear carrier, wherein the worm wheel, the planet gear, the grounded planet gear carrier, and the sun gear are configured as an epicyclic gear assembly;
urging, by the sun gear, rotation of a rotary output member;
urging, by the rotary output member, rotation of a rotary assembly of a rotary-to-linear motion conversion assembly; and
urging, by the rotary-to-linear motion conversion assembly, linear movement of a linear assembly of the rotary-to-linear motion conversion assembly.

15. The method of claim 14, wherein urging, by the epicyclic gear assembly, rotation of the sun gear further comprises:
urging, by the planet gear, rotation of the sun gear; and
urging, by the sun gear, rotation of the rotary output member.

16. The method of claim 14, further comprising urging rotation of a second worm shaft by the worm shaft, wherein the worm shaft is configured to urge rotation of the second worm shaft.

17. The method of claim 14, further comprising urging substantially synchronous deployment or stowage of two or more aircraft engine thrust reverser actuation systems, wherein a first aircraft engine thrust reverser actuation system comprises the worm shaft as a first worm shaft, and the first worm shaft is rotatably coupled to a second worm shaft of a second aircraft engine thrust reverser actuation system by a synchronization shaft configured to substantially synchronize actuation of the two or more aircraft engine thrust reverser actuation systems.

18. The method of claim 14, further comprising:
urging, by the sun gear, opposite rotation of the epicyclic gear assembly;
urging, by the epicyclic gear assembly, opposite rotation of the worm wheel; and
urging, by the worm wheel, opposite rotation of the worm shaft.

* * * * *